(12) United States Patent
Vian

(10) Patent No.: US 6,363,813 B1
(45) Date of Patent: Apr. 2, 2002

(54) COVER FOR A PARKING BRAKE

(75) Inventor: Paolo Vian, Tregnago (IT)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/687,695

(22) Filed: Oct. 17, 2000

(30) Foreign Application Priority Data

Jul. 20, 2000 (EP) .............................................. 00202618

(51) Int. Cl.⁷ ................................................ B62K 21/26
(52) U.S. Cl. .......................... 74/551.9; 74/558; 16/436
(58) Field of Search .............................. 74/551.9, 543, 74/548, 529, 536, 537, 538, 540, 558; 81/177.1, 489; 16/421, 431, 436, DIG. 12

(56) References Cited

U.S. PATENT DOCUMENTS

| | | | | |
|---|---|---|---|---|
| 626,633 A | * | 6/1899 | Robinson | 74/551.9 |
| 2,049,144 A | * | 7/1936 | Wahlberg | 74/543 |
| 2,205,769 A | * | 6/1940 | Sweetland | 145/61 |
| 2,424,437 A | * | 7/1947 | Dent | 16/116 R |
| 2,488,309 A | * | 11/1949 | Mason | 16/125 |
| 3,995,650 A | * | 12/1976 | DiVito | 135/72 |
| 4,138,905 A | * | 2/1979 | Konishi | 74/577 R |
| 4,466,309 A | * | 8/1984 | Matey | 74/551.9 |
| 5,596,894 A | * | 1/1997 | Lee | 70/201 |
| 5,933,916 A | * | 8/1999 | Loschelder | 16/110 R |
| 6,035,742 A | * | 3/2000 | Hollingsworth et al. | 74/551.9 |

FOREIGN PATENT DOCUMENTS

| DE | 19846572 | 4/2000 |
|---|---|---|
| DE | 19847524 | 5/2000 |

* cited by examiner

Primary Examiner—Thomas R. Hannon
Assistant Examiner—Vicky A. Johnson
(74) Attorney, Agent, or Firm—Lonnie Drayer

(57) ABSTRACT

A cover for a parking brake has a tubular handle body that is arranged coaxial to a lever of the parking brake and is fixable to it by fastening dowels that are positioned at a back end. A finishing back ring nut is inserted onto the back end of the handle body. An adapter with an external shape and size equal to the internal ones of the handle body and an internal hole with a shape and size varying with the external shape and size of the brake lever. A fore finishing ring nut is inserted onto the adapter.

6 Claims, 3 Drawing Sheets

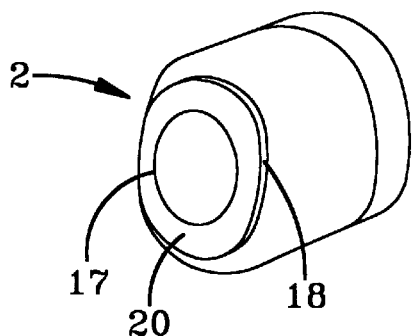
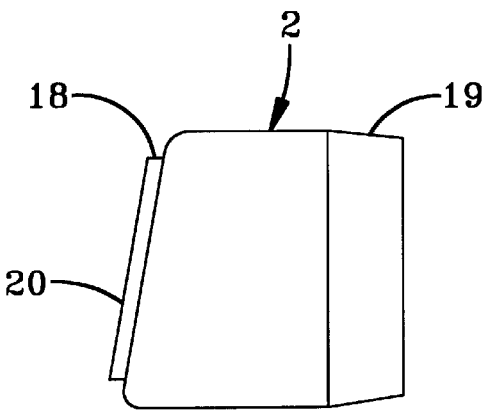
FIG-3   FIG-4
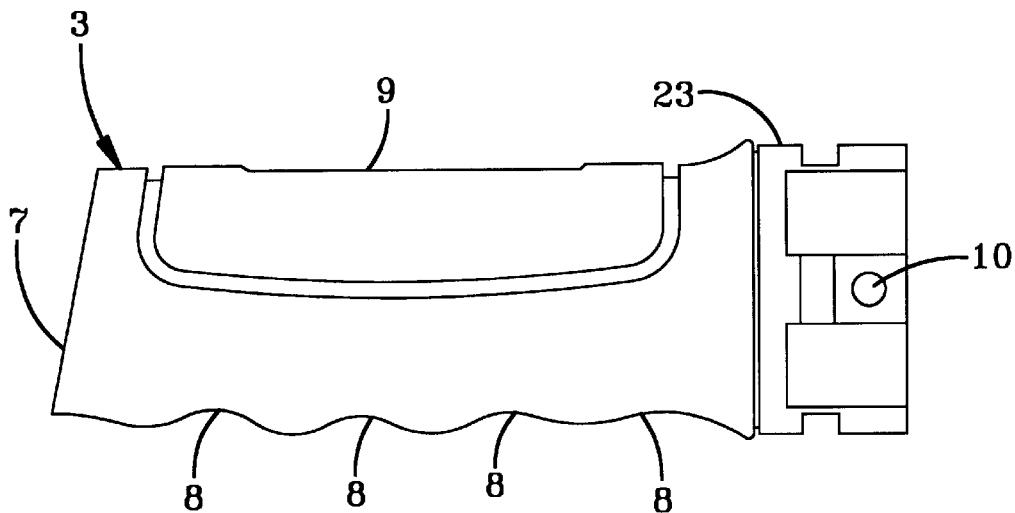
FIG-5
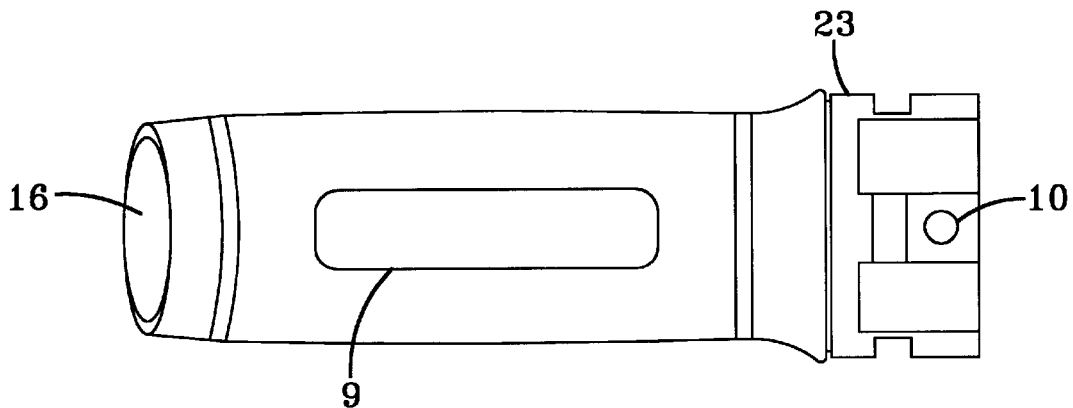
FIG-6

COVER FOR A PARKING BRAKE

FIELD OF THE INVENTION

The present invention relates to a cover for a parking brake, particularly for motorcars.

BACKGROUND OF THE INVENTION

Motorists have a need for elaborate functional and non-functional parts for their motorcars to satisfy their needs of both technical and aesthetic natures.

Aesthetics of a motorcar are important for a motorist not only for external parts of the motorcar, but also the internal trim, for instance upholstery, steering wheels, gear shift knobs and hand brake levers, etc.

The firms that manufacture motorcar accessories, as they perceive this demand, design and market components that are intended to satisfy the most disparate market demands.

One such demand is to cover of the parking brake lever or hand brake lever with a material whose execution and quality are better than what is supplied by the motorcar manufacturer.

For the cover of a parking brake there are known structures comprising a tube having a round or rectangular section that is externally coated with elements made of polyurethane that are inserted or molded together with it.

The limit of the known technique resides in having to provide a specific covering for each type of parking brake leaving no possibility to standardize the elements making up the covering structure or to modify the external coating.

There are also some coverings that are made up of a cylindrical tube having a back fastening ring nut and a fore finishing ring nut. In this case the fore end of the tube does not have a stable position on the brake lever.

SUMMARY OF THE INVENTION

There is provided in accordance with the present invention a cover for a parking brake having a tubular handle body that is arranged coaxial to the parking brake lever and fixed to it by fastening dowels that are placed at a back end thereof. A finishing back ring nut is inserted onto the back end of the handle body. An adapter has an external shape and size equal to the internal ones of the handle body and an internal hole with a shape and size variable with the external shape and size of the brake lever. A fore finishing ring nut is inserted onto the adapter.

The back ring nut can be made to hide the fastening dowels or it can function as a support for a flexible finishing cap that is in turn placed around the fastening dowels.

In accordance with the present invention it is possible to provide a cover that is couplable in a stable secure way to any type of parking brake.

BRIEF DESCRIPTION OF THE DRAWINGS

FIG. 3 is a perspective view of a tubular handle body comprised in the parking brake covering of FIGS. 1 and 2.

FIG. 4 is a side view of the handle body of FIG. 3.

FIG. 5 is a side view of an adapter comprised in the cover of FIGS. 1 and 2.

FIG. 6 is a top plan view of the adapter of FIG. 5.

DETAILED DESCRIPTION OF THE INVENTION

Figure 1:
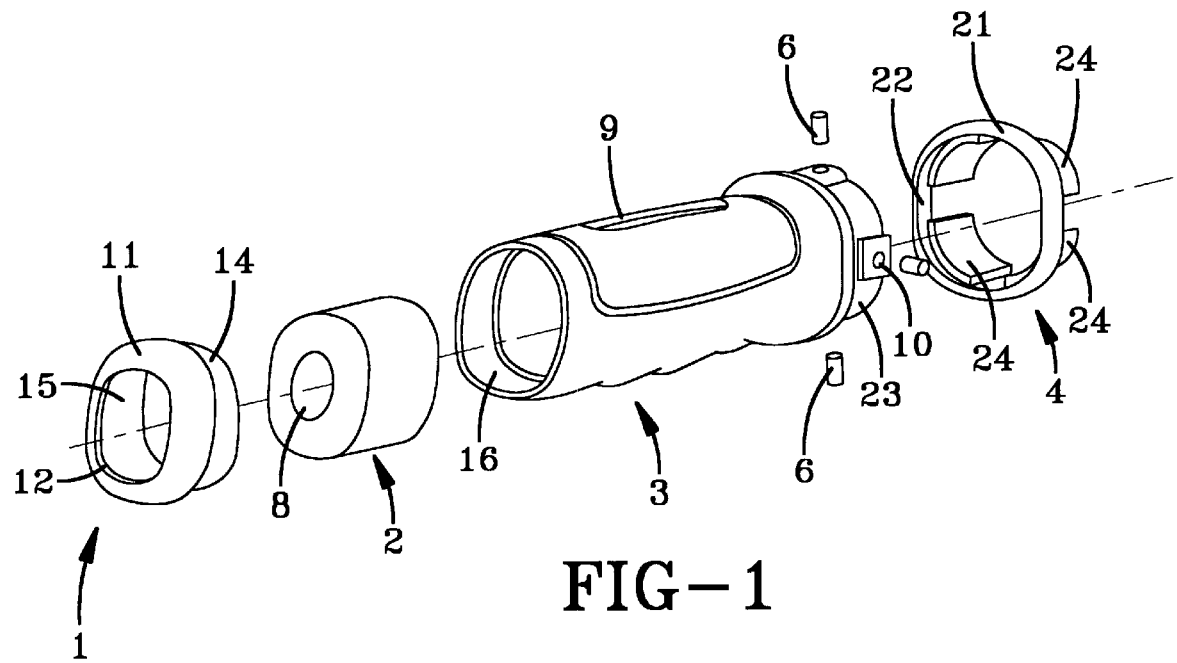
FIG. 1 is an exploded perspective view of a cover for a parking brake according to the present invention.

In FIG. 1 there is shown an exploded view of a cover for a parking brake according to the present invention that comprises a fore ring nut 1 of the pressure type, an adapter 2 made of deformable material, for example of rubber, a tubular handle body 3 with a finish made of a special decorative material such as leather or wood, and a back finishing ring nut 4.

Figure 2:
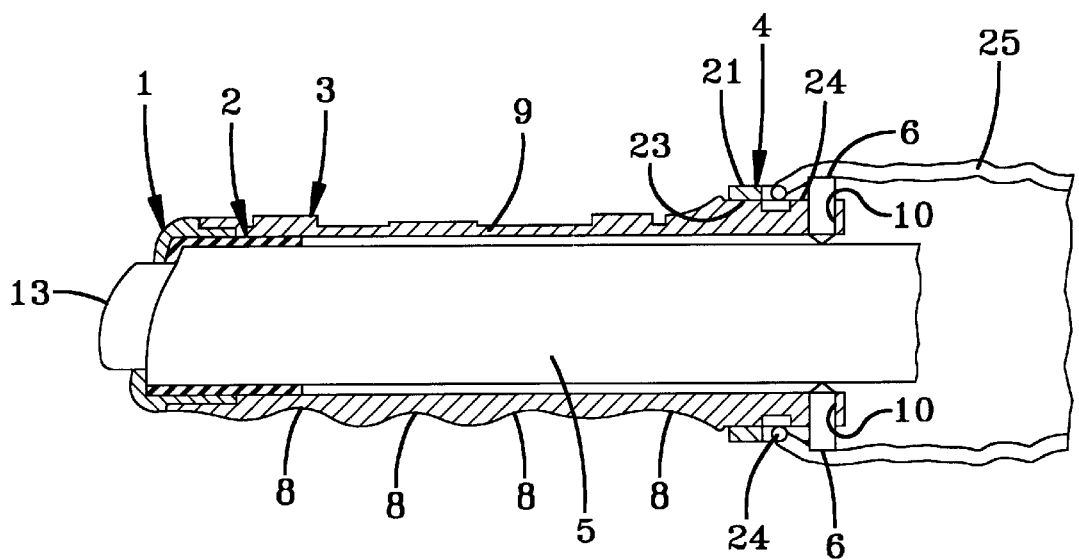
FIG. 2 is a longitudinal section of a cover according to the present invention as mounted onto the lever of a parking brake.

The hollow handle body 3 has a substantially square cross-section with rounded corners, that make it useable for any type and shape of lever 5 for a parking brake, to which it is fastened by means of fastening dowels 6 as shown in FIG. 2.

As shown in greater detail in FIGS. 5 and 6, the handle body 3 has an open end 7 that is tilted clockwise by about 70° with respect to a longitudinal axis so as to make the insertion of the adapter 2 and of the fore ring nut 1 easy.

In the lower part of the handle body 3 (FIG. 5) there are provided four external notches or undulations 8, preferably having radii different from each other, that allow a tight grip of the handle body 3 by a driver's hand.

The upper part of the handle body 3 can be coated with various types of materials such as carbon, kevlar, etc., or it can be painted or printed or embossed, as well as aluminum with various surface treatments can be used.

On the upper surface of the handle body 3 a hollow zone 9 is provided that operates as a housing for a decorative plate. This plate can be made of various materials such as aluminum, wood or precious materials. The plate can also be the housing for a three-dimensional serigraphy to meet the varied tastes of motorists.

In the back terminal part some holes 10 can be observed that are sized to receive the fastening dowels 6.

The fore ring nut 1 has a fore part 11 with a longitudinal hole 12 with a shape and size such as to allow the passage of a release button 13 of the parking brake, shown in FIG. 2, and a back part 14 with a longitudinal hole 15 having a shape and size such as to allow the pressure insertion of the ring nut 1 on the adapter 2.

The adapter 2, shown in greater detail in FIGS. 3 and 4, has in turn an external shape and size complementary to and insertable in the internal hole 16 of the handle body 3 and an internal hole 17 with a shape and size varying with the external shape and size of the lever 5 of the parking brake. In addition, the adapter has a projection 18 having a predetermined thickness to allow a perfect copying of the inside profile of the ring nut 1.

From FIG. 4 it is also to be noted that the adapter 2 has a tapered profile 19 in its back part so as to facilitate the insertion of the handle body 3. It is also to be noted that the adapter 2 has a mouth 20 that is tilted clockwise about 70° with respect to a longitudinal axis, as well as the inlet of the ring nut 1.

The back ring nut 4 provides in turn a fore ring 21 with a hole 22 having an inside shape and size such as to be able to be inserted onto a back flange 23 of the handle body 3 (FIG. 2) and four back axial protuberance 24 that are circumferencially spaced from each other and, with the ring nut 4 mounted thereon, positioned between one and the other of the holes 10 destined to receive the fastening dowels 6.

The assembly of the cover 1–4 on the lever 5 of the parking brake comprises the steps of: removing the material (generally polyurethane) that covers the same lever; inserting the usual cap or boot 25 of leather or a similar material that covers the articulation of the lever 5; inserting the back ring nut 4; inserting the handle body 3; inserting a specific adapter 2; inserting the fore ring nut 1; positioning and general fastening by means of the dowels 6; and finally positioning the cap 25 on the back ring nut 4.

A cover is thus provided that through an opportune choice of the adapter 2 becomes adaptable to any parking brake, as well as firmly positioned on the same.

In addition, a cover is provided that is aesthetically pleasant and realizable with special materials of any kind.

Figure 7:
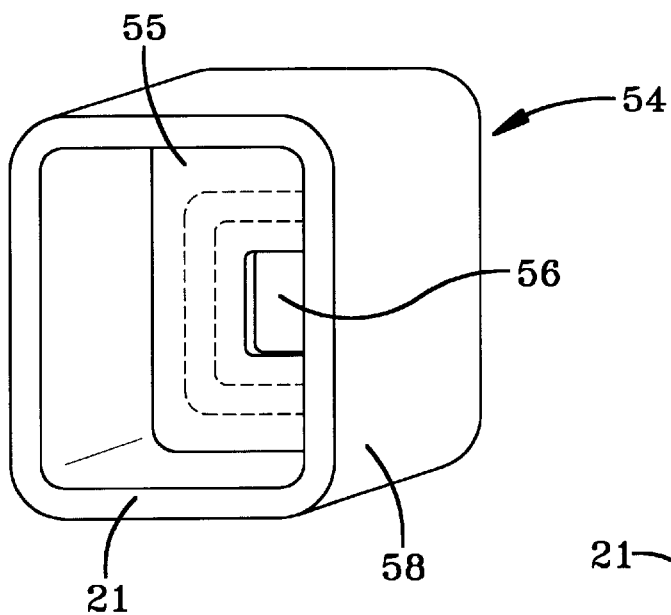
FIG. 7 is a perspective view of a variation of the back ring nut comprised in the cover of FIGS. 1 and 2.
Figure 8:
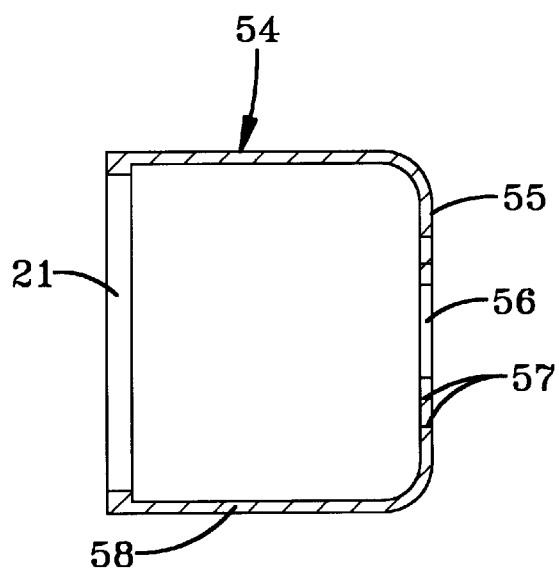
FIG. 8 is an axial section of the back ring nut of FIG. 7.

FIGS. 7 and 8 show a variation of the finishing back ring nut, herein indicated by the number 54. The ring nut 54 has a side wall 58 that continues on the back of the ring 21 and, instead of the axial projections 25, a back wall 55 is pierced by a hole 56 whose size can be varied as a function of the size of the lever 5 taking advantage of the fracture lines 57 performed in the back same wall.

Figure 9:
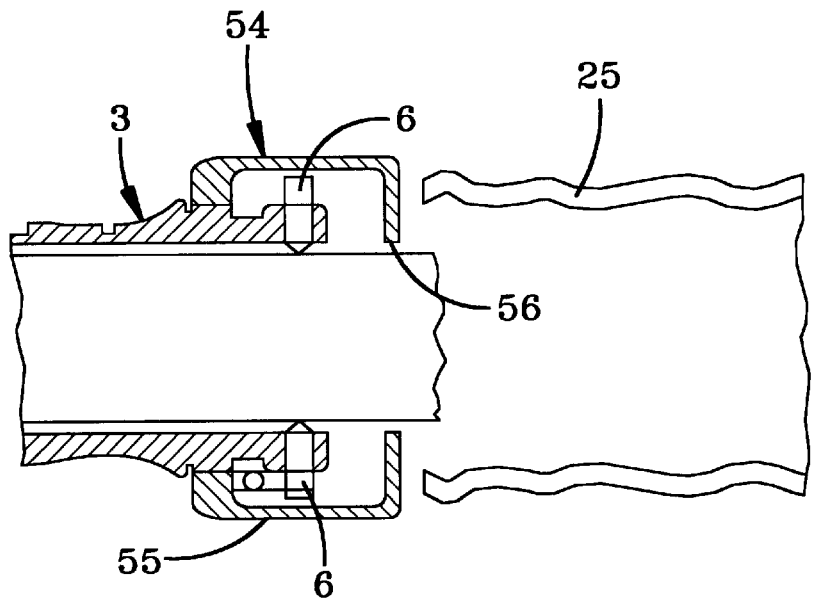
FIG. 9 is a longitudinal section view similar to the one in FIG. 2, that shows a cover with modified back ring nut as in FIGS. 7 and 8, as mounted onto the parking brake lever.

The ring nut 54 covers the fastening dowels 6, as shown in FIG. 9. The cap or boot 25 is limited to cover the remaining back part of the lever 5.

Many changes and modifications in the above-described embodiments of the invention can, of course, be made without departing from the scope thereof. Accordingly, that scope is intended to be limited only by the scope of the appended claims.

I claim:

1. A cover for a parking brake comprising a tubular handle body that is arranged coaxial to a parking brake lever and is fixable to it by means of fastening dowels that are positioned at a back end thereof, a finishing back ring nut inserted onto said back end of the handle body, an adapter with an external shape and size equal to the internal shape and size of said handle body and an internal hole with a shape and size varying with the external shape and size of the lever of the brake, and a fore finishing ring nut inserted onto said adapter.

2. The cover for a parking brake according to claim 1 wherein the adapter is made of deformable material.

3. The cover for a parking brake according to claim 2 wherein said deformable material is rubber.

4. The cover for a parking brake according to claim 1 wherein said handle body has a cavity for the housing of an ornamental plate.

5. The cover for a parking brake according to claim 1 wherein said back ring nut comprises a ring inserted onto a back flange of said handle body and of a plurality of axial back projections that are positioned between one and the other of the fastening dowels of the handle body and onto which a cap for covering the back part of the parking brake lever can be inserted.

6. The cover for a parking according to claim 1 wherein said back ring nut comprises a ring. inserted onto a back flange of said handle body of a side wall that continues on the back of said ring and of a back wall that is pierced by a hole whose size can be varied as a function of the size of the lever of the parking brake, taking advantage of fracture lines that are performed in said back wall.

* * * * *